United States Patent
Lopez et al.

(10) Patent No.: US 8,057,127 B2
(45) Date of Patent: Nov. 15, 2011

(54) SYSTEMS AND METHODS FOR ASSEMBLING AN OFFSHORE SUPPORT SYSTEM FOR USE WITH A WIND TURBINE

(75) Inventors: Francisco Garcia Lopez, Madrid (ES); Eugenio Yegro Segovia, Madrid (ES); Pedro Luis Benito Santiago, Rheine (DE)

(73) Assignee: General Electric Company, Schenectady, NY (US)

(*) Notice: Subject to any disclaimer, the term of this patent is extended or adjusted under 35 U.S.C. 154(b) by 57 days.

(21) Appl. No.: 12/637,575

(22) Filed: Dec. 14, 2009

(65) Prior Publication Data

US 2011/0135398 A1    Jun. 9, 2011

(51) Int. Cl.
*F03D 11/04* (2006.01)

(52) U.S. Cl. ......... 405/224; 405/205; 114/264; 114/266

(58) Field of Classification Search ............... 405/195.1, 405/203, 204, 205, 223.1, 224; 114/264, 114/266
See application file for complete search history.

(56) References Cited

U.S. PATENT DOCUMENTS

| | | | | |
|---|---|---|---|---|
| 3,111,692 A * | 11/1963 | Cox | ................ | 114/264 |
| 3,717,113 A * | 2/1973 | Wilde | ................ | 114/264 |
| 4,004,429 A * | 1/1977 | Mouton, Jr. | ................ | 405/195.1 |
| 4,626,137 A * | 12/1986 | Willemsz | ................ | 405/205 |
| 6,520,737 B1 | 2/2003 | Fischer et al. | | |
| 6,766,643 B2 | 7/2004 | Christensen | | |
| 7,075,189 B2 | 7/2006 | Heronemus et al. | | |
| 7,100,438 B2 | 9/2006 | LeMieux | | |
| 7,112,010 B1 | 9/2006 | Geiger | | |
| 7,156,586 B2 | 1/2007 | Nim | | |
| 7,230,347 B2 | 6/2007 | Brown et al. | | |
| 7,242,107 B1 * | 7/2007 | Dempster | ................ | 290/55 |
| 7,293,960 B2 * | 11/2007 | Yamamoto et al. | ................ | 60/497 |
| 7,508,088 B2 | 3/2009 | Kothnur et al. | | |
| 7,726,911 B1 * | 6/2010 | Dempster | ................ | 405/210 |
| 2003/0099516 A1 * | 5/2003 | Chow | ................ | 405/205 |
| 2003/0168864 A1 * | 9/2003 | Heronemus et al. | ................ | 290/55 |
| 2006/0165493 A1 | 7/2006 | Nim | | |
| 2007/0001464 A1 | 1/2007 | Kothnur et al. | | |
| 2008/0240864 A1 * | 10/2008 | Belinsky | ................ | 405/205 |
| 2010/0219645 A1 * | 9/2010 | Yamamoto et al. | ................ | 405/224 |
| 2011/0037264 A1 * | 2/2011 | Roddier et al. | ................ | 405/205 |

FOREIGN PATENT DOCUMENTS

| | | | |
|---|---|---|---|
| DE | 1223314 B | | 8/1966 |
| GB | 2459172 | * | 10/2009 |
| WO | 03004869 A1 | | 1/2003 |
| WO | 2004055272 A2 | | 7/2004 |
| WO | WO 2005021961 A1 | * | 3/2005 |

* cited by examiner

*Primary Examiner* — Frederick L Lagman
(74) *Attorney, Agent, or Firm* — James McGinness, Esq.

(57) ABSTRACT

A method of assembling an offshore support system for use with a wind turbine. The method includes coupling a damper to a wind turbine tower. A counter-balance system is coupled to the damper for suspending at least a portion of the wind turbine above a water surface. The damper is positioned at least partially below a water surface to facilitate reducing movement of the wind turbine in at least one direction. The counter-balance system is positioned at least partially below the water surface to stabilize the wind turbine when subjected to wind and tidal forces.

20 Claims, 6 Drawing Sheets

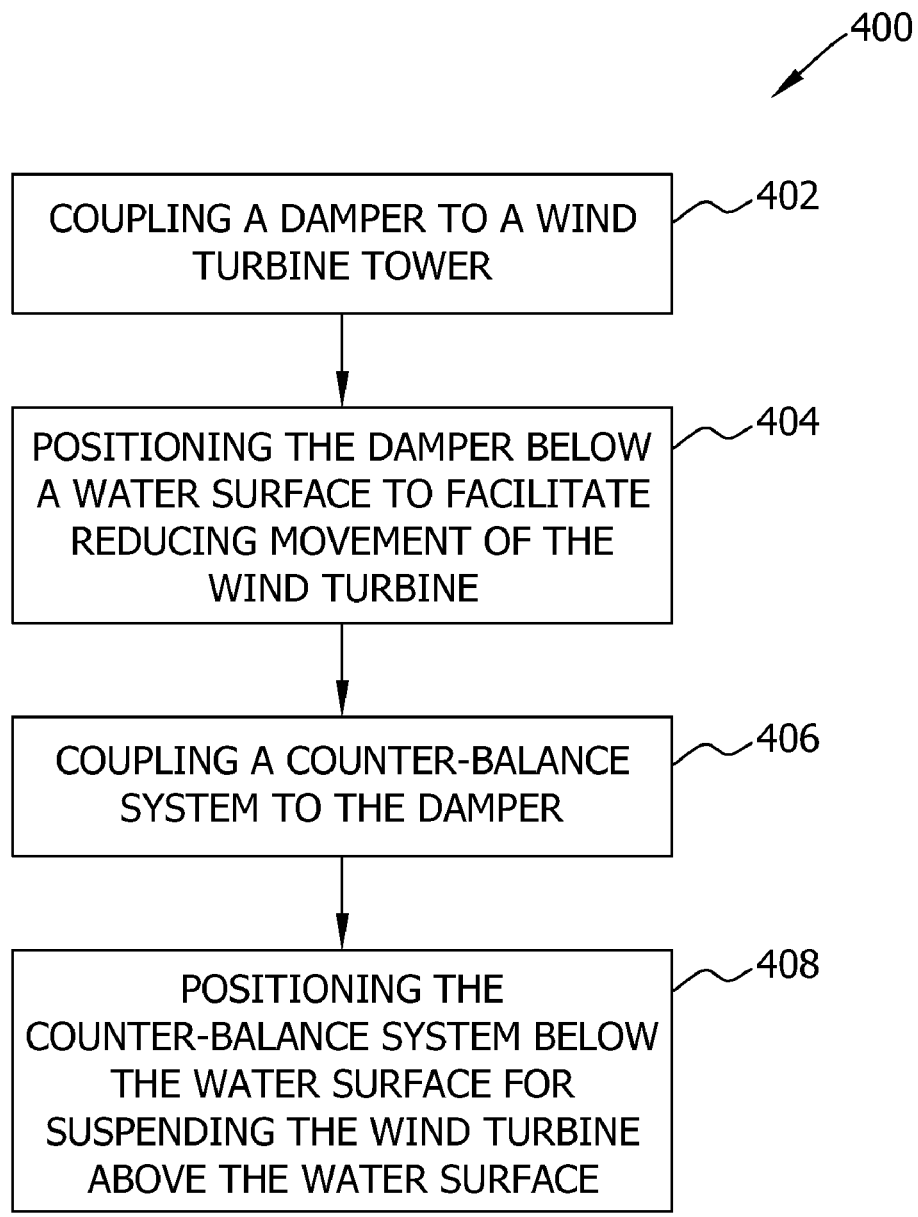

SYSTEMS AND METHODS FOR ASSEMBLING AN OFFSHORE SUPPORT SYSTEM FOR USE WITH A WIND TURBINE

BACKGROUND OF THE INVENTION

The embodiments described herein relate generally to methods and systems for assembling a wind turbine and, more particularly, to systems and methods for assembling an offshore support system for use with a wind turbine located offshore.

Wind power is quickly becoming a growing energy source around the world. Conventionally, wind turbines are clustered together as wind farms in locations that have favorable wind conditions. However, placement of these wind farms is limited due to a desire to place the wind turbines in remote locations and a need to place the wind turbines in a location with favorable wind conditions to provide increased power output.

At least some known wind turbines are currently being sited at offshore locations. Offshore wind turbines are desirable because they provide additional locations to place wind turbines and they provide favorable wind conditions due to the lack of obstruction for wind currents. At least some known wind turbines include support systems that include support columns extending from a water surface to an anchoring system positioned at a bottom surface of a body of water. As such, the location of known offshore wind turbines is limited to relatively shallow water depths of between about 15 meters (m) to about 20 m. The cost of assembling known offshore support systems in water depths greater than 20 m becomes increasingly expensive due to the increased length of the support system required. Therefore, the location of known wind turbines in offshore locations is limited to relatively shallow depth locations.

BRIEF DESCRIPTION OF THE INVENTION

In one aspect, a method of assembling an offshore support system for use in a wind turbine is provided. The method includes coupling a damper to a wind turbine tower. A counter-balance system is coupled to the damper for suspending at least a portion of the wind turbine above a water surface. The damper is positioned at least partially below a water surface to facilitate reducing movement of the wind turbine in at least one direction. The counter-balance system is positioned at least partially below the water surface to stabilize the wind turbine when subjected to wind and tidal forces.

In another aspect, an offshore support system for use in a wind turbine is provided. The offshore support system includes a damper adapted to be coupled to a wind turbine tower to facilitate reducing movement of the wind turbine in at least one direction. A counter-balance system is coupled to the damper for suspending at least a portion of the wind turbine above a water surface. The counter-balance system is configured to stabilize the wind turbine when subjected to wind and tidal forces.

In yet another aspect, a wind turbine is provided. The wind turbine includes a tower, a nacelle coupled to the tower, a rotor rotatably coupled to the nacelle, and an offshore support system coupled to the tower for suspending at least a portion of the wind turbine above a water surface. The offshore support system includes a damper that is coupled to the tower to facilitate reducing movement of the wind turbine in at least one direction. A counter-balance system is coupled to the damper. The counter-balance system is configured to stabilize the wind turbine when subjected to wind and tidal forces.

By including a damper and a counter-balance system, the embodiments described herein facilitate reducing movement of the wind turbine and stabilizing the wind turbine when subjected to wind and tidal forces. By providing an offshore support system, wind turbines may be located at any offshore location, and wind turbines are no longer limited to offshore locations with relatively shallow ocean or lake floors.

BRIEF DESCRIPTION OF THE DRAWINGS

FIGS. 1-6 show exemplary embodiments of the systems and methods described herein.

FIG. 1 is a partial perspective view of an exemplary wind turbine.

FIG. 2 is a cross-sectional view of an exemplary offshore support system suitable for use with the wind turbine shown in FIG. 1.

FIG. 3 is a top view of the offshore support system shown in FIG. 2.

FIG. 4 is a cross-sectional view of an alternative offshore support system suitable for use with the wind turbine shown in FIG. 1.

FIG. 5 is an enlarged partial view of the alternative offshore support system shown in FIG. 4.

FIG. 6 is a flow chart illustrating an exemplary method for assembling an offshore support system for use with the wind turbine shown in FIG. 1.

DETAILED DESCRIPTION OF THE INVENTION

The embodiments described herein include an offshore support system that facilitates operation of a wind turbine at an offshore location. The methods and systems described herein facilitate reducing movement of the wind turbine and stabilizing the wind turbine when subjected to wind and tidal forces. More specifically, the embodiments described herein facilitate stabilizing a wind turbine in an offshore location such that the wind turbine may be located at any offshore location and is not limited to locations with relatively shallow water depths.

Figure 1:
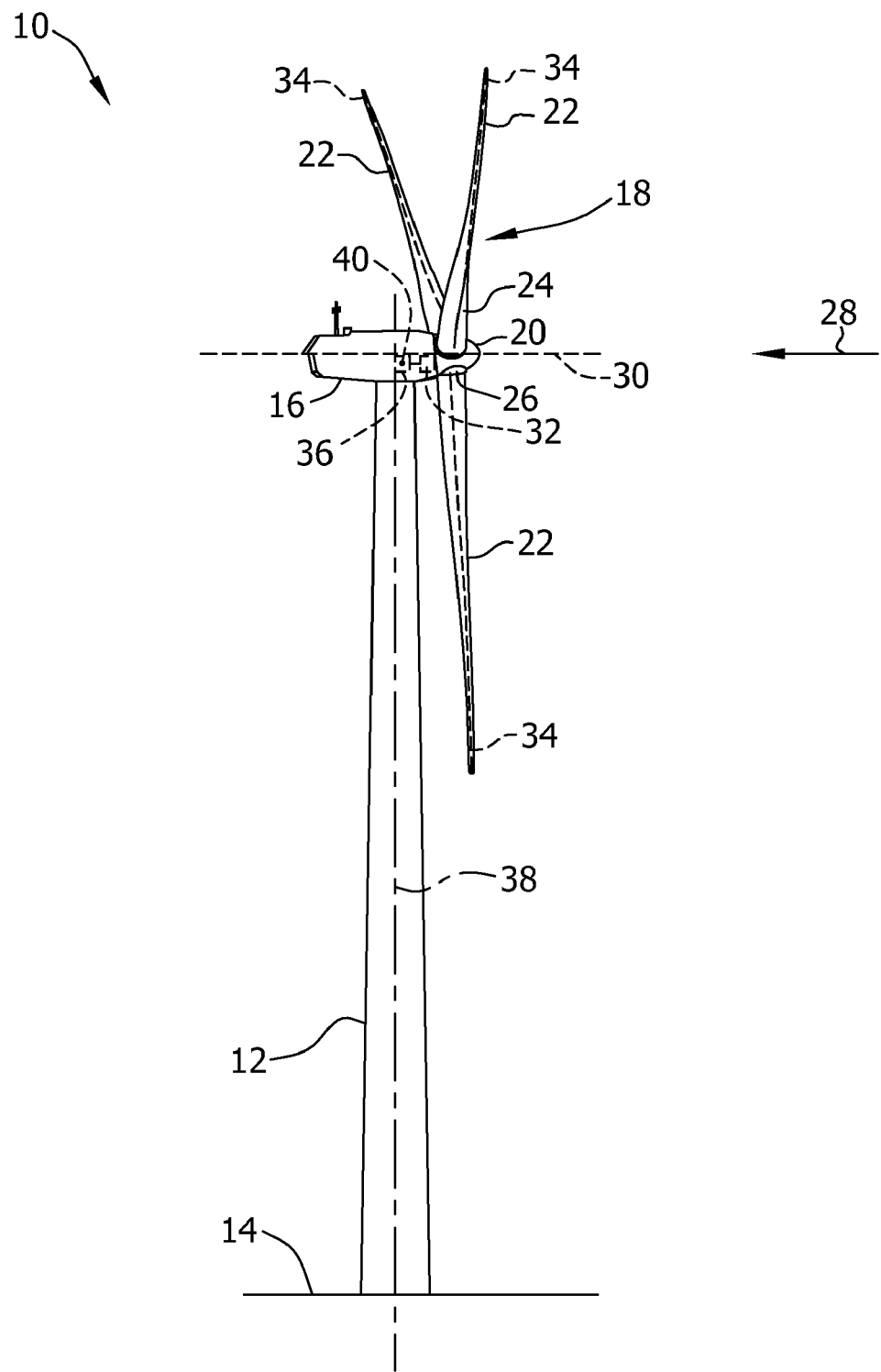

FIG. 1 is a partial perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel such that a cavity (not shown in FIG. 1) is defined between support system 14 and nacelle 16. In an alternative embodiment, tower 12 is any suitable type of tower. A height of tower 12 is selected based upon factors and conditions known in the art.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In the exemplary embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, and 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of a profile of at least one rotor blade 22 relative to wind vectors. Pitch axes 34 for rotor blades 22 are shown in FIG. 1. In the exemplary embodiment, a pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
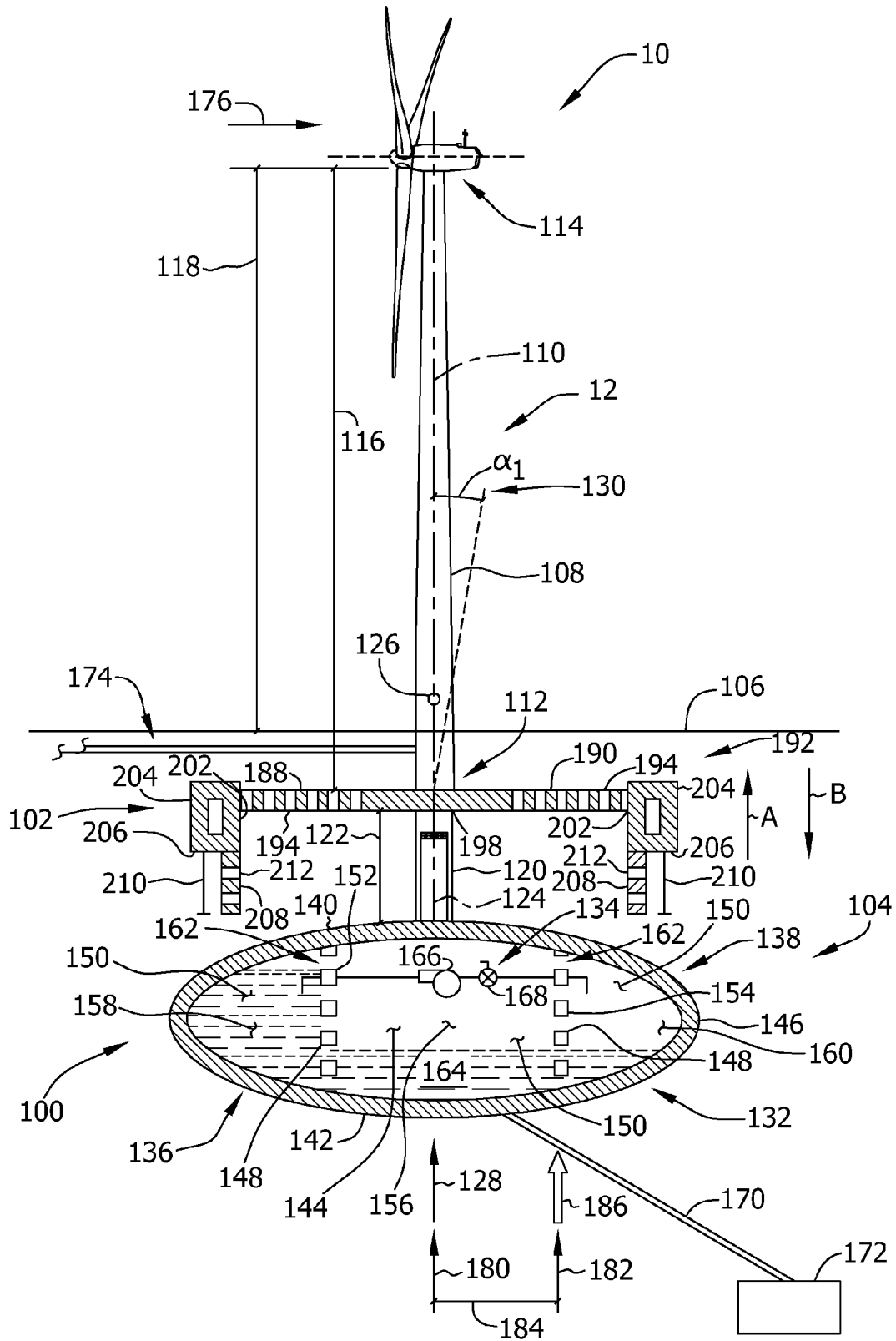
Figure 3:
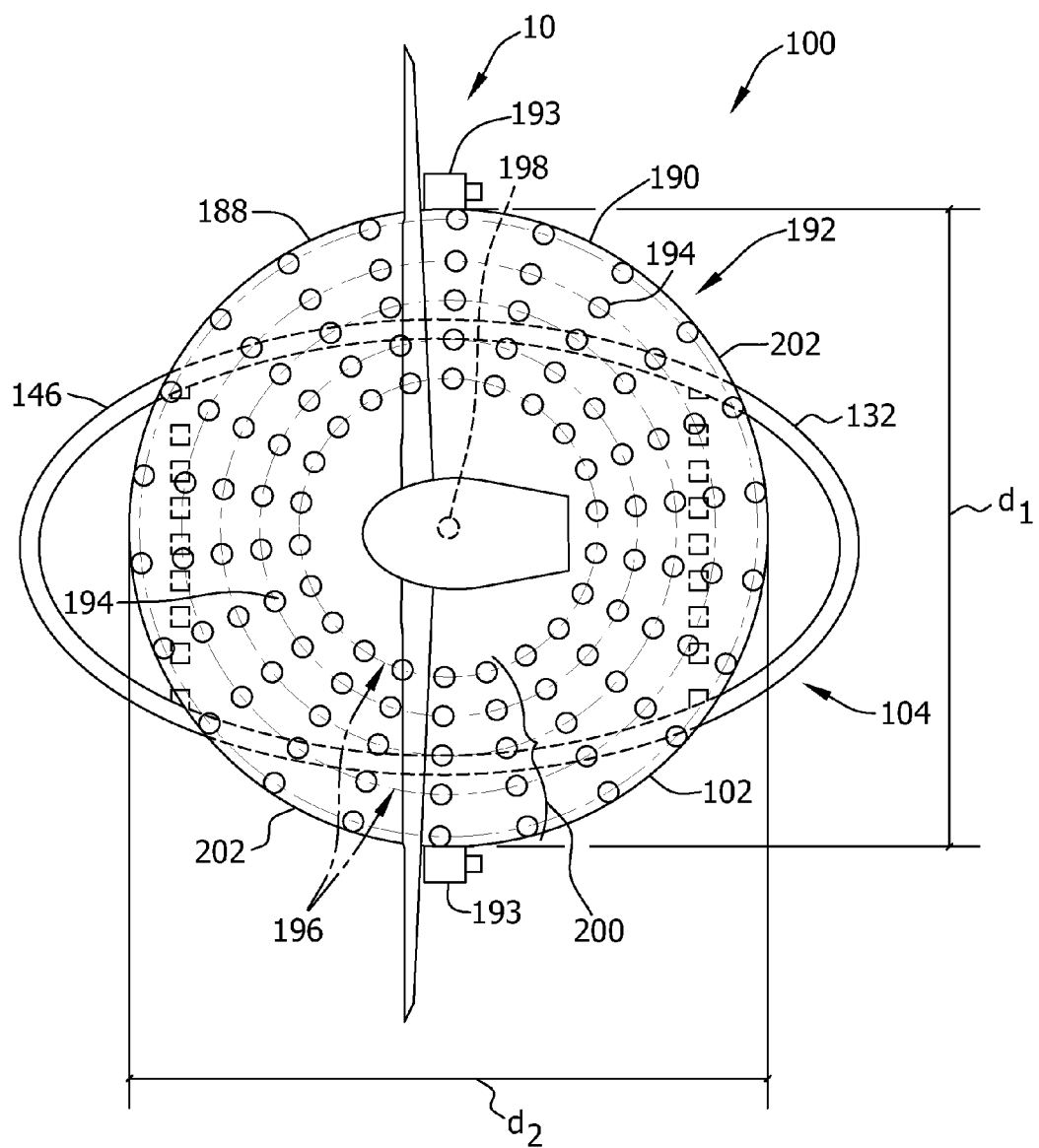

FIG. 2 is a cross-sectional view of an exemplary offshore support system 100 suitable for use with the wind turbine 10. FIG. 3 is a top view of offshore support system 100. Components shown in FIG. 1 are labeled with the same reference numbers in FIG. 2 and FIG. 3. In the exemplary embodiment, offshore support system 100 includes a damper 102 and a counter-balance system 104 for suspending at least a portion of tower 12 above a water surface 106. In one embodiment, damper 102 and counter-balance system 104 are positioned below water surface 106. Alternatively, damper 102 and counter-balance system 104 are positioned at least partially below water surface 106. Tower 12 includes an elongated body 108 having a longitudinal axis 110 extending between a base 112 and a tip 114. Elongated body 108 is coupled to damper 102 at base 112. Alternatively, tower 12 is coupled to counter-balance system 104 at base 112 and damper 102 is coupled to tower 12 and is positioned between counter-balance system 104 and water surface 106. In the exemplary embodiment, tower 12 has a substantially circular cross-section and is wider at base 112 than at tip 114 to facilitate supporting tower 12. Alternatively, tower 12 has a uniform cross-section between base 112 and tip 114. In another embodiment, tower 12 is formed from a plurality of members having a column, cross beam, and truss construction. Tower 12 has a tower height 116 such that tip 114 is generally located a distance 118 from water surface 106. In one embodiment, tower height 116 ranges from approximately ten meters up to approximately two hundred meters. In another embodiment, tower height 116 ranges from approximately sixty meters to approximately eighty meters. Tower height 116 is selected based on the anticipated wind turbine height and offshore support system 100 characteristics including, without limitation, material strength, material cost, tower assembly weight, and/or buoyancy.

In the exemplary embodiment, offshore support system 100 includes a column 120 coupled to damper 102 and to counter-balance system 104. Column 120 has a length 122 that is selectable to position counter-balance system 104 remote from damper 102 to facilitate increasing the stabilizing effect of offshore support system 100. Column 120 has a longitudinal axis 124 extending between damper 102 and counter-balance system 104. In the exemplary embodiment, longitudinal axis 124 is substantially aligned with a center of gravity 126 of wind turbine 10 such that counter-balance system 104 facilitates stabilizing wind turbine 10. More specifically, counter-balance system 104 stabilizes wind turbine 10 by shifting a center of buoyancy 128 of wind turbine 10 to return wind turbine 10 to a neutral position 130, with tower axis 110 oriented in a substantially vertical direction. Accordingly, counter-balance system 104 facilitates countering movement of tower 12 due to wind and/or wave forces and facilitates returning wind turbine 10 to a substantially vertical orientation. In an alternative embodiment, offshore support system 100 does not include column 120, wherein damper 102 is positioned at or near counter-balance system 104. In a further alternative embodiment, damper 102 is positioned circumferentially around counter-balance system 104.

In the exemplary embodiment, counter-balance system 104 includes a ballast tank 132 and a fluid distribution system 134. In one embodiment, ballast tank 132 includes a first or forward portion 136 and a second or aft portion 138. Forward portion 136 is oriented substantially similar to a direction of wind turbine 10. Ballast tank 132 further includes a first or upper tank member 140 and a lower tank member 142. Upper tank member 140 is coupled to lower tank member 142 to define a ballast cavity 144 between upper tank member 140 and lower tank member 142. In the exemplary embodiment, ballast tank 132 has an oblong-shaped outer surface 146. Alternatively, ballast tank 132 may include an outer surface 146 that has any shape suitable to enable counter-balance system 104 to function as described herein. A plurality of interior walls 148 are each coupled to and extend between upper tank member 140 and lower tank member 142 to define a plurality of ballast chambers 150 within ballast tank 132. In the exemplary embodiment, ballast tank 132 includes a forward interior wall 152 positioned nearer forward portion 136, and an opposing aft interior wall 154 positioned nearer aft portion 138. A center ballast chamber 156 is defined between forward interior wall 152 and aft interior wall 154. Forward interior wall 152 is coupled to and extends between upper tank member 140 and lower tank member 142 to define a forward ballast chamber 158 between forward interior wall 152 and forward portion 136. Aft interior wall 154 is coupled to and extends from upper tank member 140 and lower tank member 142 to define an aft ballast chamber 160 between aft interior wall 154 and aft portion 138. Forward interior wall 152 and aft interior wall 154 each include a plurality of openings 162 that provide flow communication between forward ballast chamber 158, center ballast chamber 156, and aft ballast chamber 160. In one embodiment, forward interior wall 152 and aft interior wall 154 each include a porous membrane. In another embodiment, forward interior wall 152 and aft interior wall 154 do not include openings 162. In the exemplary embodiment, ballast tank 132 includes three ballast chambers. In an alternative embodiment, ballast tank 132 includes any suitable number of ballast chambers to enable counter-balance system 104 to function as described herein.

Fluid distribution system 134 is positioned within ballast tank 132 and coupled in flow communication with ballast cavity 144 for channeling a ballast 164 between forward ballast chamber 158, center ballast chamber 156, and/or aft ballast chamber 160. In the exemplary embodiment, ballast 164 includes sea water and at least partially fills ballast tank 132 for providing a counter-weight to wind turbine 10. Alternatively, ballast 164 may include any other suitable ballast fluid to enable counter-balance system 104 to function as described herein.

Fluid distribution system 134 includes at least one flow control device 166. Flow control device 166 is, for example, a pump, a compressor, a fan, a blower, and/or any other suitable device for controlling a flow of ballast 164 between the ballast chambers. In one embodiment, flow control device 166 includes a valve 168 that is configured to regulate a flow of ballast within fluid distribution system 134, including a flow rate and/or a flow direction. In the exemplary embodiment, flow control device 166 is reversible for changing a direction of ballast 164. Control system 36 is considered to be a component of counter-balance system 104 and is in operational control communication with fluid distribution system 134. As used herein, "operational control communication" refers to a link, such as a conductor, a wire, and/or a data link, between two or more components of wind turbine 10 that enables signals, electric currents, and/or commands to be communicated between the two or more components. The link is configured to enable one component to control an operation of another component of wind turbine 10 using the communicated signals, electric currents, and/or commands. Control system 36 may be directly coupled in operational control communication with each flow control device 166 and/or may be coupled in operational control communication with each flow control device 166 via a communication hub and/or any other suitable communication device(s).

Due to the floating characteristics of offshore support system 100, wind turbine 10 is capable of being moved from location to location. However, in an alternative embodiment, a mooring line 170 is coupled to ballast tank 132 and then coupled to an anchor 172 to facilitate retaining wind turbine 10 at a desired or selected location. In one embodiment, mooring line 170 may be at least one of a cable, chain, rope, and/or wire. One or more cables 174 are coupled to wind turbine 10 for transmitting power and/or communication signals from wind turbine 10 to a central wind farm operating center (not shown) and/or other wind turbines coupled to wind turbine 10 to form a wind farm.

During operation of wind turbine 10, a wind force 176 acting on wind turbine 10 will partly be transformed into rotational energy and partly into a moment tending to bend tower 12 in the direction of wind force 176, whereby tower 12 tends to incline such that axis 110 assumes an inclination angle $\alpha_1$ relative to vertical. In the exemplary embodiment, control system 36 will operate counter-balance system 104 when inclination angle $\alpha_1$ is at least a predetermined angle from vertical, such as when inclination angle $\alpha_1$ is at least 3 degrees from vertical. Alternatively, control system 36 will operate counter-balance system 104 when wind turbine 10 is positioned any inclination angle from vertical. With wind turbine 10 oriented in neutral position 130, inclination angle $\alpha_1$ is approximately equal to zero. In neutral position 130, ballast 164 is distributed evenly within ballast cavity 144, and between forward ballast chamber 158, center ballast chamber 156, and aft ballast chamber 160. During operation of wind turbine 10, when wind force 176 acts upon wind turbine 10 such that tower 12 is oriented at an inclination angle $\alpha_1$ greater than zero, counter-balance system 104 operates to move center of buoyancy 128 to counteract wind force 176. More specifically, counter-balance system 104 channels ballast 164 from aft ballast chamber 160 towards forward ballast chamber 158 that is opposite wind force 176. By moving ballast 164 to a ballast chamber opposite wind force 176, center of buoyancy 128 of wind turbine 10 is moved from a first position 180 aligned with axis 110 to a second position 182 at a sufficient distance 184 from axis 110, such that an upward buoyancy force 186 acts upon wind turbine 10 to counteract wind force 176 and return wind turbine 10 to neutral position 130. With wind force 176 no longer acting upon wind turbine 10, counter-balance system 104 channels ballast 164 from forward ballast chamber 158 to center ballast chamber 156 and aft ballast chamber 160 by gravity to return center of buoyancy 128 to first position 180, and wind turbine 10 remains at or returns to neutral position 130. In an alternative embodiment, flow control device 166 operates to channel ballast 164 from forward ballast chamber 158 to center ballast chamber 156 and aft ballast chamber 160 to return center of buoyancy 128 to first position 180.

In the exemplary embodiment, damper 102 facilitates providing hydrodynamic drag to reduce movement of tower 12, and to increase stability of wind turbine 10 by limiting movement of wind turbine 10 in a vertical direction, in a horizontal direction, and/or in a rotational direction. In one embodiment, damper 102 includes a first damper member 188 coupled to a second damper member 190 to form damper 102 with a substantially round shape. Alternatively, damper 102 includes any suitable number of damper members such that damper 102 functions as described herein. In an alternative embodiment, damper 102 is formed having one of a rectangular shape, a square shape, or any other shape suitable to enable offshore support system 100 to function as described herein. Damper members 188 and 190 are coupled to column 120 and/or tower 12. In the exemplary embodiment, first and second damper members 188 and 190 have a semi-circular shape and are coupled together to form damper 102 with a substantially disk-shaped body 192 having a first diameter $d_1$ that is selectable to provide a suitable surface area of body 192, oriented perpendicular to axis 110, to facilitate stabilizing wind turbine 10. More specifically, damper 102 creates hydrodynamic drag on wind turbine 10 when wind turbine 10 is moving in the direction of arrow A, and damper 102 creates hydrodynamic drag on wind turbine 10 when wind turbine 10 is moving in the direction of arrow B. In one embodiment, first damper member 188 is asymmetrical with second damper member 190 to form damper 102 having an asymmetrical shape that includes first diameter $d_1$ and a second diameter $d_2$ that is different than first diameter $d_1$. In a further embodiment, damper 102 includes a yaw system 193 for rotating damper 102 about longitudinal axis 110, wherein control system 36 is in operational control communication with yaw system 193. Optionally, first and second damper members 188 and 190 include a plurality of openings 194 extending through body 192 that allow water to be channeled as a jet thereby facilitating a dampening effect on wind turbine 10 movement. In the exemplary embodiment, openings 194 are arranged in a plurality of circles 196 oriented concentric to a damper center 198. In an alternative embodiment, openings 194 are aligned in a plurality of rows 200 that extend from damper center 198 towards an outer surface 202 of damper body 192, and are oriented circumferentially about damper center 198.

Damper 102 further includes a third damper member 204 that is coupled to outer surface 202 of damper body 192. In the exemplary embodiment, third damper member 204 includes one or more floats 206 for providing hydrodynamic drag to reduce movement of wind turbine 10 in a vertical direction. In one embodiment, third damper member 204 includes a plurality of floats 206 positioned circumferentially about outer surface 202 to form an annular ring. In another embodiment, third damper member 204 includes a plurality of floats 206 positioned symmetrically about outer surface 202. In an alternative embodiment, third damper member 204 includes one or more stabilizer walls 208 that extend substantially vertically a distance 210 from damper outer surface 202 for providing hydrodynamic drag to reduce movement of wind turbine 10 in a horizontal direction and/or in a rotational direction. Stabilizer wall 208 facilitates attenuating motion of wind turbine 10 in a side-to-side direction, such as in a direction of arrow C or arrow D, shown in FIG. 4. Moreover, stabilizer wall 208 facilitates reducing rotational motion of wind turbine 10 in a direction of arrow E, also shown in FIG. 4. Optionally, stabilizer wall 208 includes one or more openings 212 extending through stabilizer wall 208 that allow water to be channeled as a jet thereby facilitating a dampening effect on wind turbine 10 movement.

Figure 4:
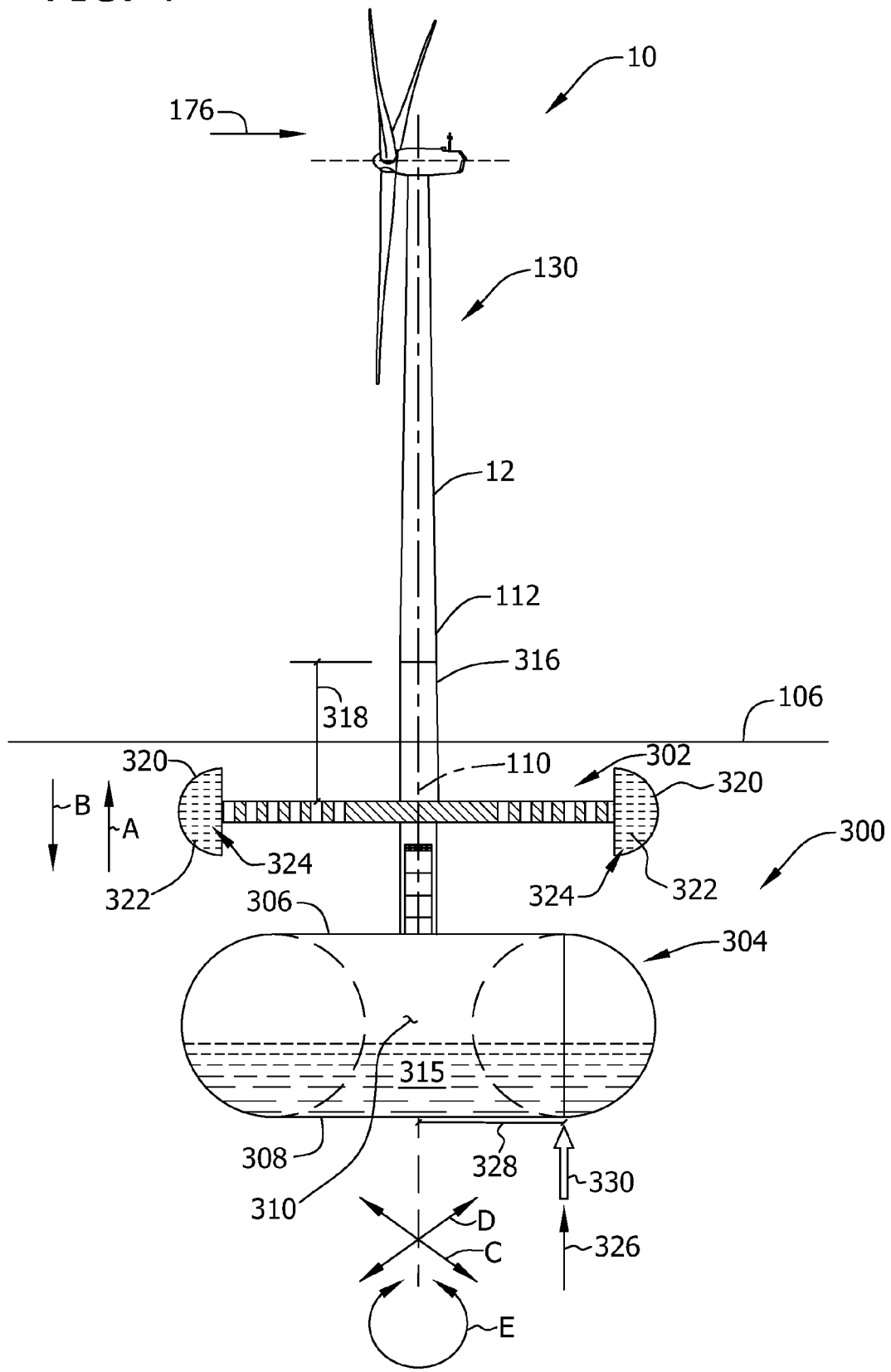
Figure 5:
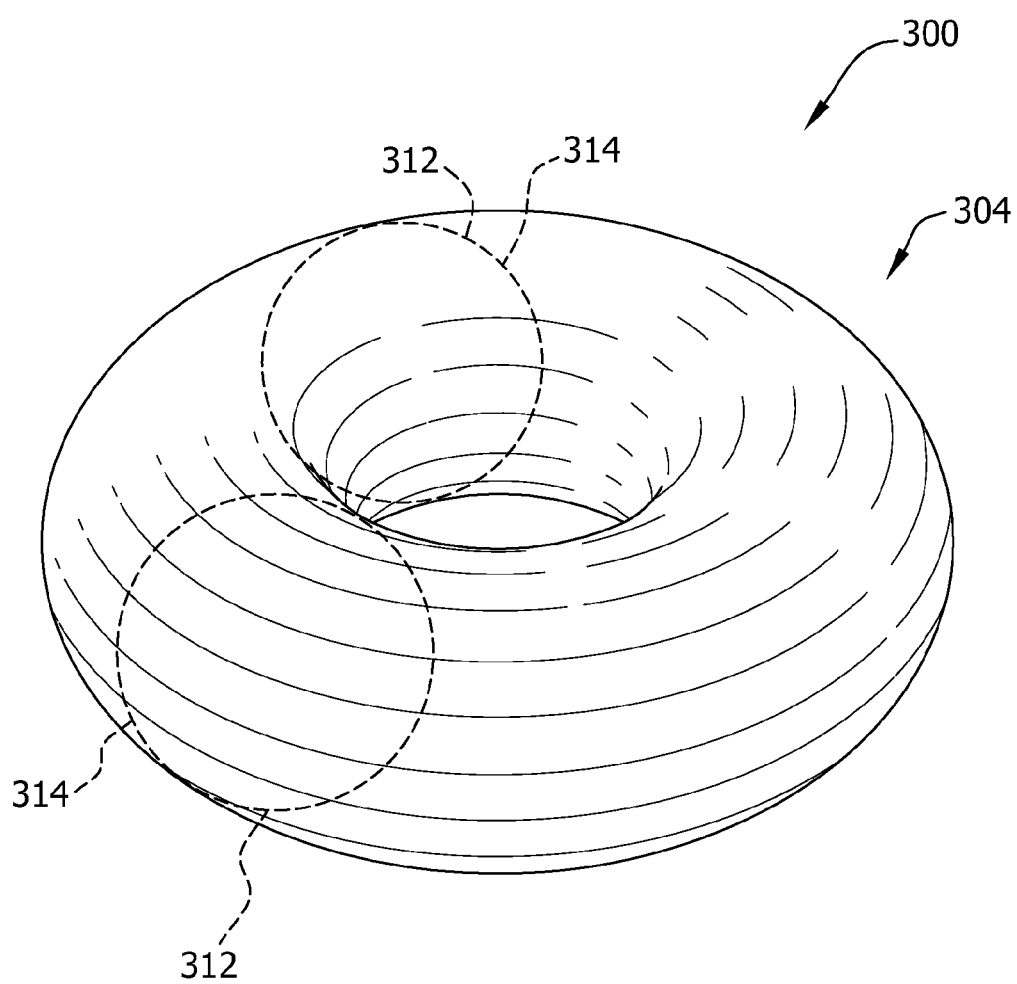

FIG. 4 is a cross-sectional view of an alternative offshore support system 300 suitable for use with wind turbine 10. FIG. 5 is an enlarged partial view of offshore support system 300 shown in FIG. 4. Components shown in FIG. 2 are labeled with similar reference numbers in FIG. 4. Components shown in FIG. 4 are labeled with similar reference numbers in FIG. 5. In this alternative embodiment, offshore support system 300 includes a damper 302 and a counter-balance tank 304. Counter-balance tank 304 includes a first tank member 306 that is coupled to a second tank member 308 to form counter-balance tank 304 having a toroidal shape and defining a cavity 310. Alternatively, counter-balance tank 304 is formed as a unitary member defining cavity 310. In the alternative embodiment, offshore support system 300 further includes a plurality of counter weights 312, shown in FIG. 5, movably positioned within counter-balance tank 304 for stabilizing wind turbine 10. In the alternative embodiment, counter weights 312 have a spherical-shaped outer surface 314 that enables counter weights 312 to freely move through cavity 310. In one embodiment, offshore support system 300 includes a ballast 315 that includes sea water and at least partially fills counter-balance tank 304. In such an embodiment, counter weights 312 may be filled with a fluid having a lesser density than ballast 315, i.e. air, hydrogen, and/or any other suitable material. Alternatively, ballast 315 may include any other suitable ballast fluid to enable counter-balance tank 304 to function as described herein.

In one embodiment, offshore support system 300 includes a support column 316 that extends between damper 302 and tower 12. Support column 316 is coupled to tower base 112 and to damper 302, and has a length 318, such that tower 12 is elevated above water surface 106 to facilitate reducing wear on tower 12 and increasing the useful life of tower 12.

In an alternative embodiment, damper 302 includes a third damper member 320 that includes one or more fins 322 having a semi-spherical cross-sectional shape for providing hydrodynamic drag to reduce movement of wind turbine 10 in a horizontal direction and/or in a rotational direction. Alternatively, fins 322 have any suitable cross-sectional shape including, without limitation, a triangular, an elliptical, an polygonal, or a rectangular cross-sectional shape. Fins 322 facilitate attenuating motion of wind turbine 10 in a side-to-side direction, such as in a direction of arrow C or arrow D, shown in FIG. 4. Moreover, fins 322 facilitate reducing rotational motion of wind turbine 10 in a direction of arrow E, also shown in FIG. 4. Optionally, third damper member 320 includes a one or more openings 324 extending through fins 322 that allow water to be channeled as a jet thereby facilitating a dampening effect on wind turbine 10 movement.

During operation of counter-balance tank 304, with wind force 176 acting upon wind turbine 10 to move wind turbine 10 from neutral position 130 to an inclined position relative to vertical, counter weights 312 move freely within counter-balance tank 304 to a position opposite a direction of wind force 176 to move a center of buoyancy 326 a sufficient distance 328 from axis 110 to enable an upward acting buoyancy force 330 to counteract wind force 176 and orient wind turbine 10 at neutral position 130.

FIG. 6 is a flowchart of an exemplary method 400 for assembling offshore support system 100. In the exemplary embodiment, method 400 includes coupling 402 damper 102 to a wind turbine tower 12. Damper 102 is at least partially positioned 404 below water surface 106 to facilitate reducing movement of the wind turbine 10 in a vertical direction. Counter-balance system 104 is coupled 406 to damper 102 for suspending wind turbine 10 above water surface 106. Counter-balance system 104 is positioned 408 below water surface 106 to stabilize wind turbine 10 with wind turbine 10 subjected to wind and/or tidal forces. In one embodiment, first damper member 188 is coupled to second damper member 190 to form damper body 192, and openings 194 are defined through damper body 192 to form damper 102. In another embodiment, upper tank member 140 is coupled to lower tank member 142 to form ballast tank 132 having ballast chamber 150. Ballast 164 is positioned within ballast chamber 150 to form counter-balance system 104. In a further embodiment, first tank member 306 is coupled to second tank member 308 to form toroidal-shaped counter-balance tank 304 that includes cavity 310, and counter weights 312 are positioned within cavity 310.

The above-described wind turbine is fabricated and assembled in a cost-effective and reliable manner. The wind turbine includes an offshore support assembly for supporting a wind turbine at any offshore location, and is not limited to offshore locations with relatively shallow water depths, i.e. water depths less than 30 m. The offshore support system includes a damper and a counter-balance system to suspend the wind turbine at least partially above a water surface and facilitate reducing movement of the wind turbine. More specifically, the damper facilitates creating hydrodynamic drag on tower assembly to attenuate movement of tower assembly. The counter-balance system facilitates stabilizing the wind turbine at a neutral position when the wind turbine is subjected to wind and/or tidal forces. As a result, the offshore support system facilitates allowing the wind turbine to be located at any offshore location, including locations at significant water depths, i.e., water depths greater than 20 m as well as shallow water depths, in a reliable and cost-effective manner.

Exemplary embodiments of systems and methods for assembling an offshore support system for use with a wind turbine are described above in detail. The systems and methods are not limited to the specific embodiments described herein, but rather, components of the systems and/or steps of the methods may be utilized independently and separately from other components and/or steps described herein. For example, the methods may also be used in combination with other offshore support systems, and are not limited to practice with only the wind turbine as described herein. Rather, the exemplary embodiment can be implemented and utilized in connection with many other offshore support system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling an offshore support system for use with a wind turbine, said method comprising:
coupling a first damper member to a wind turbine tower;
coupling at least a second damper member to the first damper member and to the tower to form a damper body that circumscribes the tower;
coupling a plurality of floats to the damper body;
coupling a counter-balance system to the damper body for suspending at least a portion of the wind turbine above a water surface;
positioning the damper body at least partially below the water surface to facilitate reducing movement of the wind turbine in at least one direction; and,
positioning the counter-balance system at least partially below the water surface to stabilize the wind turbine when subjected to wind and tidal forces.

2. A method in accordance with claim 1, further comprising defining a plurality of openings extending through the damper body to facilitate channeling water as a jet through the plurality of openings to facilitate a dampening effect on the wind turbine.

3. A method in accordance with claim 1, further comprising:
forming a ballast tank defining a ballast chamber; and,
positioning a ballast within the ballast chamber to form the counter-balance system.

4. A method in accordance with claim 1, further comprising:
forming a toroidal-shaped tank defining a cavity; and,
positioning at least one counter weight within the cavity to form the counter-balance system.

5. An offshore support system for use with a wind turbine, said offshore support system comprising:
a damper adapted to be coupled to a wind turbine tower to facilitate reducing movement of the wind turbine in at least one direction, said damper comprising:
a damper body comprising an outer surface that circumscribes the wind turbine tower; and
a plurality of floats coupled to said outer surface, said plurality of floats oriented circumferentially about said damper body; and,
a counter-balance system coupled to said damper for suspending at least a portion of the wind turbine above a water surface, said counter-balance system configured to stabilize the wind turbine when subjected to wind and tidal forces.

6. An offshore support system in accordance with claim 5, wherein said damper body comprises at least one opening defined through said body.

7. An offshore support system in accordance with claim 5, wherein said damper further comprises a yaw system coupled to said damper body for rotating the tower about a tower axis.

8. An offshore support system in accordance with claim 5, wherein said damper further comprises at least one of a fin and a stabilizer wall coupled to said damper body.

9. An offshore support system in accordance with claim 5, wherein said damper comprises a first damper member coupled to a second damper member to form a substantially disk-shaped body.

10. An offshore support system in accordance with claim 5, wherein said counter-balance system comprises a ballast tank defining a plurality of ballast chambers and including a ballast.

11. An offshore support system in accordance with claim 10, further comprising a fluid distribution system providing flow communication between said plurality of ballast chambers for moving said ballast between said plurality of ballast chambers to facilitate adjusting a center of buoyancy of the wind turbine.

12. An offshore support system in accordance with claim 11, further comprising a control system in operational control communication with said fluid distribution system, said control system configured to control operation of the fluid distribution system to facilitate stabilizing the wind turbine.

13. An offshore support system in accordance with claim 5, wherein said counter-balance system comprises a counter-balance tank having a toroidal shape and defining a cavity.

14. An offshore support system in accordance with claim 13, wherein said counter-balance system further comprises at least one counter weight positioned within said cavity, said counter weight movable within said cavity to facilitate stabilizing the wind turbine.

15. A wind turbine, comprising:
  a tower;
  a nacelle coupled to said tower;
  a rotor rotatably coupled to said nacelle; and,
  an offshore support system coupled to said tower for suspending at least a portion of said wind turbine above a water surface, said offshore support system comprising:
  a damper coupled to said tower to facilitate reducing movement of the wind turbine in at least one direction, said damper comprising:
    a damper body comprising an outer surface that circumscribes the wind turbine tower; and
    a plurality of floats coupled to an outer surface of said damper body, said plurality of floats oriented circumferentially about said damper body; and,
  a counter-balance system coupled to said damper, said counter-balance system configured to stabilize said wind turbine when subjected to wind and tidal forces.

16. A wind turbine in accordance with claim 15, wherein said damper body comprises a plurality of openings defined through said body.

17. A wind turbine in accordance with claim 16, wherein said damper further comprises at least one of a fin, and a stabilizer wall coupled to said damper body.

18. A wind turbine in accordance with claim 15, wherein said counter-balance system comprises a ballast tank defining a plurality of ballast chambers and including a ballast.

19. A wind turbine in accordance with claim 18, wherein said offshore support system further comprises:
  a fluid distribution system providing flow communication between said plurality of ballast chambers for moving said ballast between said plurality of ballast chambers to facilitate adjusting a center of buoyancy of said wind turbine; and,
  a control system in operational control communication with said fluid distribution system, said control system configured to control operation of said fluid distribution system to facilitate stabilizing said wind turbine.

20. A wind turbine in accordance with claim 15, wherein said counter-balance system comprises:
  a counter-balance tank having a toroidal shape and defining a cavity; and,
  at least one counter weight positioned within said cavity, wherein said counter weight is movable within said cavity to facilitate stabilizing said wind turbine.

* * * * *